Nov. 2, 1926.

1,605,369

J. A. MILLER

TRUCK FOR PLEASURE RAILWAY CARS

Filed Nov. 16, 1925         2 Sheets-Sheet 1

Inventor,
John A. Miller
By Brown, Boettcher & Dienner
Attys.

Nov. 2, 1926.

J. A. MILLER 1,605,369

TRUCK FOR PLEASURE RAILWAY CARS

Filed Nov. 16, 1925      2 Sheets-Sheet 2

Inventor,
John A. Miller
By Brown, Boettcher & Dienner
Attys.

Patented Nov. 2, 1926.

1,605,369

UNITED STATES PATENT OFFICE.

JOHN A. MILLER, OF HOMEWOOD, ILLINOIS.

TRUCK FOR PLEASURE RAILWAY CARS.

Application filed November 16, 1925. Serial No. 69,270.

My invention relates to trucks for pleasure railway cars and the object is to produce a flexible, individual wheel truck structure which will automatically adjust itself to keep the wheels in engagement with the rails, the invention being particularly adaptable in four wheel cars for keeping the wheels on the rails, particularly when the car is traveling around short or banked curves.

The advantages of my improved construction will be apparent from the structure disclosed on the drawings, in which:—

On the part of the car body shown, 10 represents one of the side walls, 11 the car floor, 12 one of the running boards, and 13 a seat structure.

Figure 1:
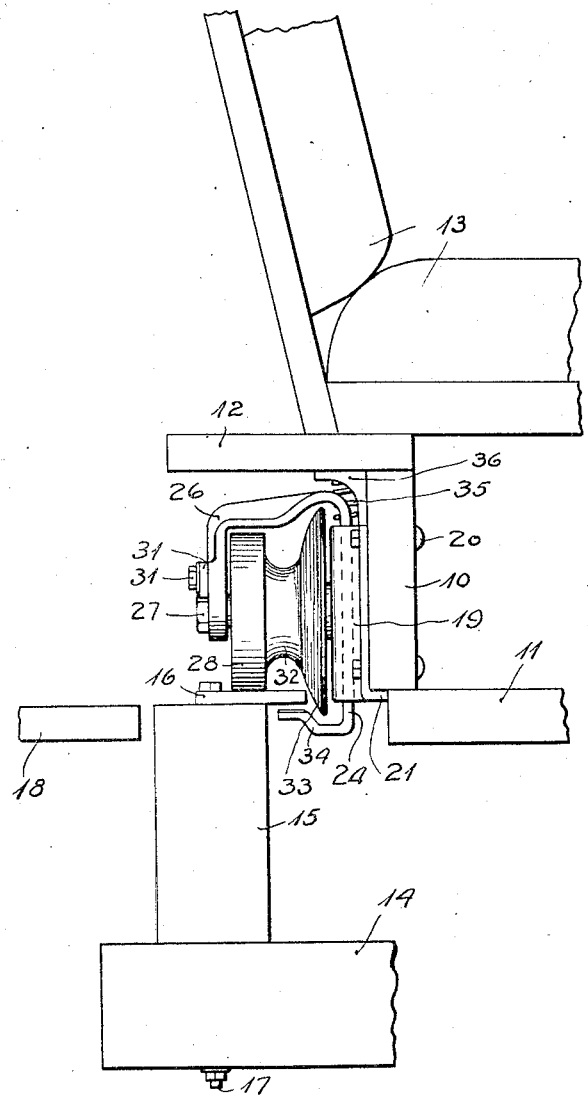
Figure 1 is an end elevational view of part of the car body, a truck structure and part of the track.
Figure 2:
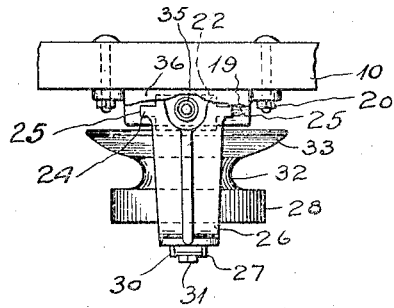
Fig. 2 is a plan view of the truck structure.
Figure 4:
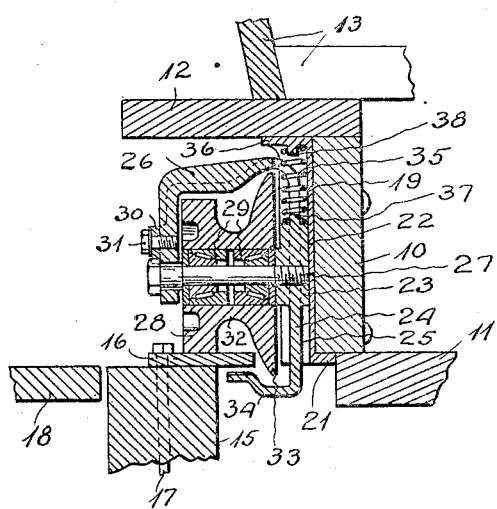
Fig. 4 is a sectional view on plane 4—4 of Fig. 3.
Figure 3:
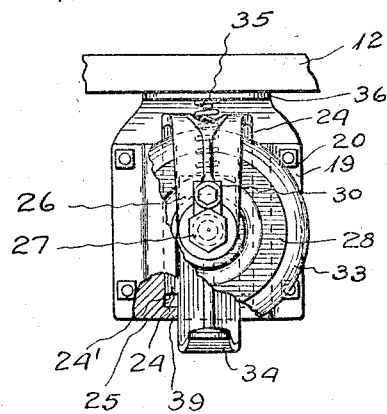
Fig. 3 is a side elevational view of a truck structure with part of the wheel and frame broken away.

The track structure shown comprises tie beams 14, track beams 15, and flat rails 16, bolts 17 extending through the rails, track beams and tie beams to secure the structure together, the flat rails overhanging the inner sides of the track beams 15, as clearly shown in Fig. 1. A platform 18 is shown which may either be the loading platform or the unloading platform of the pleasure railway structure over which the car is designed to travel.

The truck units are secured to the side walls 10 of the car body, one such unit being shown. Each unit comprises a supporting casting or base 19 secured to the vehicle side 10 by bolts 20 and having the lower flanges 21 engaging under the lower edge of the side wall to assist in aligning and securely holding the base in place. The base has the vertical channel 22 for the wheel carriage body 23, the guide rails 24 along the sides of the body engaging in the guide grooves 25 adjacent to the channel 22, the wheel carriage being thus vertically reciprocable on the base 19. A bracket 26, integral with the body, extends outwardly from the top thereof and then downwardly, an axle bolt 27 extending through the end of the bracket and threading into the body part 23, and this bolt journals the vehicle wheel 28, suitable ball bearing structures 29 being interposed between the bolt and the wheel. In order to lock the axle bolt in position, a lock plate 30 engages with the bolt head and is held in place by the screw 31 threading into the bracket.

The cylindrical outer end of the wheel engages the flat rail 16 over the track beam 15, and the wheel has the lateral extension or neck 32 terminating in a flange 33 for engaging with the inner edge of the rail 16, so that the wheels will limit the lateral play of the car and will keep the cylindrical traction ends 28 of the wheels in position on the rails above the supporting track beams 15. The inner faces of the wheel flanges 33 are well rounded, as shown, in order to reduce the frictional engagement between such surfaces and the rails.

At its lower end the wheel carriage body is deflected upwardly to form an underlocking guard arm 34, whose ends extend below the overhanging inner side of the rail 16 so as to engage with the under side of such rail to limit the vertical displacement of the car on the rails. The underlocking guard arms co-operate with the wheel flanges to hold the car to the rails.

When a four wheel car travels over a track of which the rails are not even, the car will be inclined to rock as the wheels do not uniformly engage with the rails. This is particularly true on rounding curves and where the rails are banked. The car is thus strained and its traction friction greatly increased. To overcome all this and to insure good uniform traction engagement and smooth riding, I adapt the trucks for vertical movement relative to the car body. I interpose a compression spring 35 between the wheel carriage and a rigid abutment which may be in the form of a flange 36 extending from the upper end of the base 19 to overhang the carriage body. In order to confine the spring in position, the carriage body and the abutment may be provided with pins or lugs 37 and 38, respectively, for engaging the spring ends. The spring will tend to force the wheel carriage downwardly, but the load on the car will tend to force the car body towards the wheel carriage against the force of the spring, and during running of the car the position of the wheel carriage will depend upon the weight of the load relative to the force of the spring. The downward movement of the wheel carriage is limited by the engagement of the lower ends 24' of the carriage guide rails 24 with the bottom or lower end wall 39 of the guide channel 22.

With the arrangement described, when a wheel encounters a raised portion of the track it is running on, the yieldably supported carriage will rise so as to prevent any of the other wheels from leaving the rail vertically. Likewise if a depression is encountered, the wheel can follow it and thus keep all four wheels on the rails and prevent rocking or distortion of the car. In going around curves which are usually banked, the flexible vertically yielding truck will keep all four wheels firmly against the rails so that the car can travel smoothly and without strain and undue friction around the curves. By thus keeping the wheels to the rails, the wheel flanges and the underlocking guard arms 34 will be subjected to less strain. When, by virtue of centrifugal force, the car tends to move away from the rail, the truck springs will shift the wheel carriages downwardly as the car body rises, and the wheels will not leave the rails, nor the guard arms engage with the undersides of the rails until the ends 24' of the guides have engaged with the bottom 39 of the carriage guide channel and further downward movement of the carriage relative to the car body stops. Then, upon further rise of the car body, the wheels will leave the rails but such movement will be limited by engagement of the guard arms with the rails. Upon return of the car after vertical movement thereof away from the rails, the well rounded flanges 33 will co-operate with the rails to gradually and smoothly re-align the car laterally on the rails. The abutment ends of the guard arms 34 are above the adjacent peripheries of the respective flanges 33 so that the abutment ends will engage the rails before the flanges can rise above the rail top, the wheels being thus always locked against lateral displacement from the rails. By virtue of the spring floating support of the trucks irregularities in the tracks are taken up locally and not conveyed to the entire car body, and there will, therefore, be much smoother running.

Having described my invention, I claim the following:—

1. The combination with a pleasure railway car, of a truck structure, said truck structure comprising a supporting base secured to the car body and having a vertical guideway, a carriage shiftable in said guideway, a track structure engaging wheel journaled in said carriage, a spring tending to shift said carriage downwardly to hold said wheel in engagement with the track structure on which the car is running, and a track structure engaging abutment on said carriage for limiting the vertical movement of said carriage relative to the rail structure.

2. The combination with a pleasure railway car, of a truck structure, and a track structure, said truck structure comprising a carriage shiftable vertically on said car, a flanged traction wheel journaled in said carriage for engaging with the top and inner sides of the rail structure, an abutment on said carriage for engaging with the under side of the rail structure, and yielding means tending to shift said carriage downwardly to hold said wheel in engagement with the track structure.

3. In combination, a pleasure rail-way car, a truck structure, and a track structure, said track structure having upper, inner and under rail surfaces, said truck structure comprising a carriage shiftable vertically relative to the car body, a flanged vehicle wheel journaled in said carriage for engaging with the top and inner rail surfaces, respectively, of said track structure, an abutment on said carriage for engaging with the under rail surface of the track structure, and yielding means acting against said carriage and tending to move it to hold said wheel in engagement with the upper rail surface.

4. In combination, a pleasure railway car, a truck structure, and a rail, said truck structure comprising a support secured to the car body, a wheel carriage shiftable vertically on said support, a wheel journaled in said carriage for engaging on the upper side of said rail, said wheel having a flange for engaging against the inner side of said rail, an abutment on said carriage for engaging against the under side of the rail, and a spring tending to force said carriage downwardly to hold said wheel against the top of the rail.

5. In combination, a pleasure railway car, a truck structure, and a rail in the form of a flat bar, a carriage on said car body, a flanged wheel journaled in said carriage and engaging against the top and the inner side of said flat rail, and an extension on said carriage having abutting engagement with the under side of said flat rail to limit the vertical movement of the body relative to the rail.

6. In combination, a pleasure railway car, a truck structure, and a track structure, said track structure comprising a supporting beam and a flat rail secured on top of said beam and overhanging beyond the inner edge thereof, said truck structure comprising a carriage and a wheel structure journaled therein, the outer end of said wheel structure engaging on said flat rail above the rail support, a flange at the inner end of the wheel structure for engaging against the inner edge of the rail, and an abutment extending from said carriage for engaging against the under side of the overhanging parts of said rail.

7. The combination with a pleasure railway car, of a truck structure and a track structure, said truck structure comprising a carriage shiftable vertically on said car, a flanged traction wheel journalled in said carriage for engaging with the top and inner sides of the rail structure, an abutment on said carriage for engaging with the under side of said rail structure, and yielding means tending to shift said carriage downwardly to hold said wheel in engagement with the track structure, the wheel flange being at all times below the upper abutment surface of said abutment whereby lateral displacement of said wheel from said rail structure will be prevented.

In witness whereof, I hereunto subscribe my name this 9th day of November, 1925.

JOHN A. MILLER.